United States Patent
Parker et al.

(10) Patent No.: US 7,501,467 B2
(45) Date of Patent: Mar. 10, 2009

(54) ALIPHATIC ESTER COMPOUNDS AS SLIP AGENTS IN POLYESTER POLYMERS

(75) Inventors: David Andrew Parker, North Humberside (GB); Adam Maltby, North Humberside (GB); Martin Read, North Humberside (GB); Philip McCoy, North Humberside (GB)

(73) Assignee: Croda International PLC, North Humberside (GB)

( * ) Notice: Subject to any disclaimer, the term of this patent is extended or adjusted under 35 U.S.C. 154(b) by 466 days.

(21) Appl. No.: 10/534,529

(22) PCT Filed: Mar. 2, 2005

(86) PCT No.: PCT/GB2005/000805

§ 371 (c)(1),
(2), (4) Date: Jun. 27, 2005

(87) PCT Pub. No.: WO2005/085340

PCT Pub. Date: Sep. 15, 2005

(65) Prior Publication Data

US 2006/0100331 A1    May 11, 2006

(30) Foreign Application Priority Data

Mar. 2, 2004    (GB)    .................    0404620.7

(51) Int. Cl.
*C08K 5/10* (2006.01)
*C08K 5/101* (2006.01)
*C08G 63/00* (2006.01)
*C07C 69/74* (2006.01)

(52) U.S. Cl. .................. 524/322; 524/315; 524/318; 528/308; 528/308.6; 560/1

(58) Field of Classification Search ................ 524/322, 524/315, 318; 528/303, 308.6; 560/1
See application file for complete search history.

(56) References Cited

U.S. PATENT DOCUMENTS

| | | | |
|---|---|---|---|
| 4,606,976 A * | 8/1986 | Hensel et al. | 428/480 |
| 5,013,773 A * | 5/1991 | Nomura et al. | 523/222 |
| 5,741,586 A * | 4/1998 | Zierer et al. | 428/364 |
| 5,998,005 A * | 12/1999 | Kanno | 428/221 |
| 6,068,910 A * | 5/2000 | Flynn et al. | 428/141 |
| 6,326,435 B1 | 12/2001 | Takayama et al. | |
| 2007/0066731 A1* | 3/2007 | Tattum et al. | 524/311 |

FOREIGN PATENT DOCUMENTS

| | | |
|---|---|---|
| EP | 0577091 | 6/1993 |
| EP | 0947543 | 10/1999 |
| GB | 1244917 | 9/1971 |
| GB | 2152061 | 7/1985 |
| GB | 2302543 | 1/1997 |
| JP | 1207344 | 8/1989 |
| JP | 4342766 | 11/1992 |
| JP | 5255577 | 10/1993 |
| JP | 6157879 | 6/1994 |
| JP | 859974 | 3/1996 |
| JP | 9272191 | 10/1997 |
| JP | 1171506 | 3/1999 |
| JP | 2004 12610 | 1/2004 |
| WO | 9311206 | 6/1993 |

OTHER PUBLICATIONS

Search Reports dated Mar. 29, 2004, Apr. 4, 2005, Apr. 8, 2005 and Jun. 17, 2005.

* cited by examiner

*Primary Examiner*—Mark Eashoo
*Assistant Examiner*—Michael Pepitone
(74) *Attorney, Agent, or Firm*—Novak, Druce & Quigg, LLP

(57) ABSTRACT

Use of a compound of general formula (1) as a slip agent in a PET polymer, wherein: R and $R^1$ represent hydrocarbon moieties, each hydrocarbon moiety comprising 6 to 24 carbon atoms and wherein R and/or $R^1$ may be linear, branched chain, saturated or contain one or more double a bonds; X represents one of the moieties (a), wherein A represents a hydrocarbon moiety comprising 2 to 36 carbon atoms and may be linear, branched chain, saturated or contain one or more double bonds.

34 Claims, 1 Drawing Sheet

ALIPHATIC ESTER COMPOUNDS AS SLIP AGENTS IN POLYESTER POLYMERS

This application is a 35 U.S.C. §371 U.S. National Stage Application of International Application No. PCT/GB2005/000805, filed on Mar. 2, 2005, claiming the priority of Great Britain Application No. 0404620.7, filed Mar. 2, 2004.

The present invention relates to polymer additives. It is particularly applicable to additives which reduce the coefficient of friction of a polyester polymer, such as PET.

Poly(ethylene terephthalate) (PET) is an important plastics material, widely used in the manufacture of moulded polyester articles and films. The key advantages of using PET are:

High clarity
Light weight
Good processability
Excellent barrier properties against oxygen and carbon dioxide
Good impact resistance
Tough—virtually unbreakable
Economic Largely as a consequence of the above properties, the most important plastic application for PET homopolymer and copolymers is in the manufacture of bottles.

PET bottles are produced predominantly using a two stage stretch blow moulding process. Firstly a preform is produced by injection moulding. This is a relatively thick—walled part with the neck features moulded during this process. The preform is then reheated in a reheat blow machine which stretches the preform by a stretching pin and inflates it by blowing air into the mould to give the desired shape. This gives a biaxially orientated container which provides improved properties such as clarity and gas barrier performance. This is especially important for carbonated drink containers.

PET bottles may also be manufactured by injection blow moulding which is a 2-stage technique performed on a single machine. The preform is injection moulded and whilst still hot is moved to a blowing station where it is blown up to the desired shape. This is the preferred technique for small containers requiring specific neck detail or finish and produces containers that are less biaxially-orientated.

A major difficulty in fabricating articles from PET is the relatively high coefficient of friction of the polymer. In the manufacture of bottles this problem can manifest itself in a number of ways:

Less than optimum packing density when performs are packed into a box with concomitant higher storage and transportation costs.
Poor flow on conveying equipment and hence reduced throughput
Surface defects due to poor scratch resistance There is thus a need for an effective additive system for PET which reduces the coefficient of friction of the polymer and thus overcomes the above deficiencies.

Additives that are effective in reducing the coefficient of friction of polymers are known in the industry as slip additives. However, in order to be acceptable for beverage containers, the fabricated PET bottle must exhibit low colour and high clarity, with low taste and odour and be non-toxic. This imposes other important requirements on a slip agent in addition to its friction-reducing properties.

The conventional slip agents of choice in the plastics industry are fatty amides. These additives are widely used in polyolefins such as polyethylene, polypropylene, and related copolymers. Fatty amides employed as slip additives are generally manufactured from fatty acids containing between 16 and 22 carbon atoms and are characterised by a variety of structural forms:

Primary amides which can be either monounsaturated (as exemplified by erucamide and oleamide) or saturated (as exemplified by stearamide and behenamide)
Secondary amides as exemplified by stearyl erucamide and oleyl palmitamide
Bis amides such as ethylene bis stearamide In view of their widespread usage in polymer systems, it might appear logical to consider fatty amides as slip agents for polyesters such PET. However we have established that although fatty amides do demonstrate some friction reducing properties in PET, the lowering of the coefficient of friction is much less than in polyolefins. Moreover all amides cause discolouration in injection moulded PET which will severely restrict their utility in this polymer.

Those skilled in the art will be aware that separate and different classes of polymers have widely different chemical compositions and different molecular architectures. Thus, polyester polymers such as PET cannot be compared with polyvinyl chloride (PVC), polyamides such as nylon, or other classes of polymer. Not only do they behave differently as polymers, but different slip agents are required with different polymer classes. That is to say, one cannot extrapolate or predict how a particular compound, or mixture of compounds, will perform as slip agents in one agent based on its performance as a slip agent in a different class of polymers.

Conventional slip agent technology cannot therefore be readily applied to in PET. This is particularly the case in bottle (preform) manufacture where in addition to low coefficient of friction, other strict requirements with regard to colour, taste and odour must be met.

It is therefore an object of the present invention to provide compositions having improved slip and anti-block characteristics when used in polymers such as PET and wherein other properties of the polymer are not adversely affected.

Figure 1:
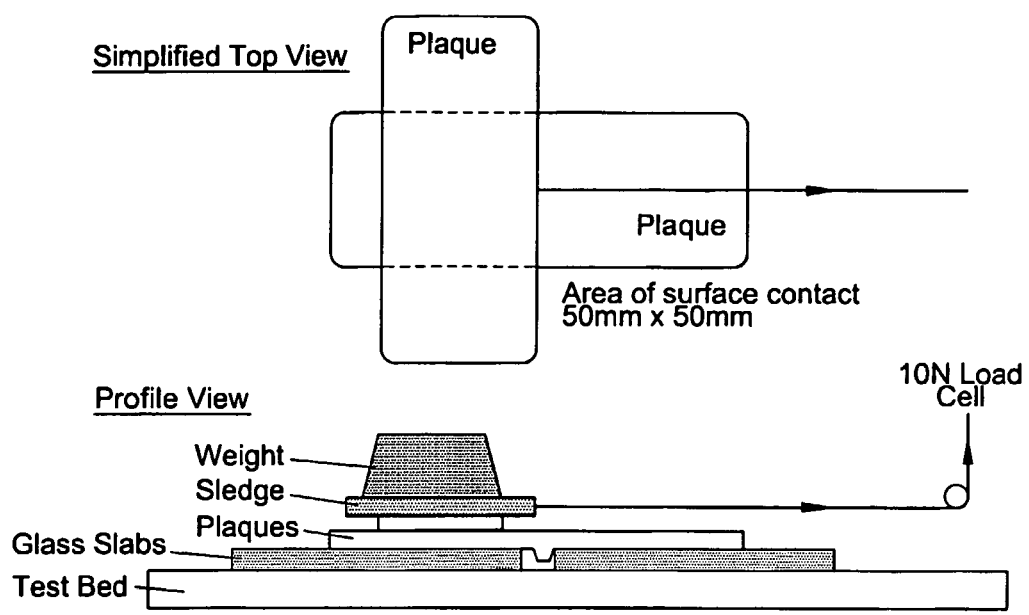
FIG. 1 is the schematic top view and profile view of the test apparatus used to measure the coefficient of friction (static and kinetic).

According to a first aspect of the present invention there is provided use of a compound of general Formula 1 as a slip agent in a polyester polymer:

$$R-X-R^1 \qquad (1)$$

wherein: R and $R^1$ represent hydrocarbon moieties, each hydrocarbon moiety comprising 1 to 34 carbon atoms and wherein R and/or $R^1$ may be linear, branched chain, saturated or contain one or more double bonds; and wherein X represents one of the moieties:

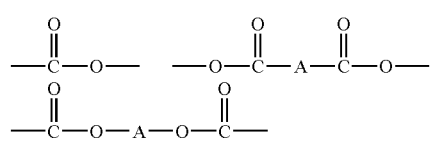

wherein A represents a hydrocarbon moiety comprising 2 to 36 carbon atoms and may be linear, branched chain, saturated or contain one or more double bonds.

Preferably the total number of carbon atoms in R, R¹ and X is greater than 16 and more preferably greater than 22.

In a particularly preferred embodiment the total number of carbon atoms in R, R¹ and X is greater than 35.

Preferably X represents the moiety

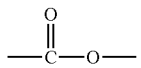

and the total number of carbon atoms in R, R¹ and X is between 23 and 44.

In a particularly preferred embodiment the composition of general Formula 1 is selected from the group comprising stearyl stearate, stearyl behenate, behenyl behenate, ethylene glycol distearate, ethyl behenate, behenyl acetate, palmityl myristate, palmityl palmate or mixtures thereof.

In a particularly preferred embodiment the polyester polymer is selected from the group comprising:
poly(butylenes terephthalate)
poly(cyclohexanedimethylene terephthalate)
poly(ethylene isophthalate)
poly(ethylene 2,6-naphthalenedicarboxylate)
poly(ethylene phthalate)
poly(ethylene terephthalate).

Preferably said composition of general Formula 1 is present in said polymer in an amount of between 0.1% to 1.0% wt/wt.

In a particularly preferred embodiment said composition is present in said polymer in an amount of between 0.2% to 0.75% wt/wt.

According to a second aspect of the invention there is provided a polyester polymer incorporating one or more slip agents of general Formula 1:

$$R—X—R^1 \quad (1)$$

wherein: R and R¹ represent hydrocarbon moieties, each hydrocarbon moiety comprising 1 to 34 carbon atoms and wherein R and/or R¹ may be linear, branched chain, saturated or contain one or more double bonds; and wherein X represents one of the moieties:

wherein A represents a hydrocarbon moiety comprising 2 to 36 carbon atoms and may be linear, branched chain, saturated or contain one or more double bonds.

Preferably the total number of carbon atoms in R, R¹ and X is greater than 16 and more preferably greater than 22.

In a particularly preferred embodiment the total number of carbon atoms in R, R¹ and X is greater than 35.

Preferably X represents the moiety

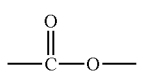

and the total number of carbon atoms in R, R¹ and X is between 23 and 44.

In a particularly preferred embodiment the slip agent of general Formula 1 is selected from the group comprising stearyl stearate, stearyl behenate, behenyl behenate, ethylene glycol distearate, ethyl behenate, behenyl acetate, palmityl myristate, palmityl palmate or mixtures thereof.

Where the polymer is intended for fibre production the slip agent is preferably not a stearyl ester such as stearyl stearate or other additives specifically named in GB2152061 (Snia Fibre SpA). The additives referred to in GB2152061 are described in the context of extruding fibres, not in the context of a slip additive, or in the context of preforms or bottles as in the present application.

Preferably said polymer is selected from a group comprising:
poly(butylenes terephthalate)
poly(cyclohexanedimethylene terephthalate)
poly(ethylene isophthalate)
poly(ethylene 2,6-naphthalenedicarboxylate)
poly(ethylene phthalate)
poly(ethylene terephthalate)
and co-polymers thereof.

Preferably said slip agent(s) are present in said polyester polymer in an amount of between 0.1% to 1.0% wt/wt.

In a particularly preferred embodiment said slip agent(s) are present in said polyesterpolymer in an amount of between 0.2% to 0.75% wt/wt.

According to a third aspect of the present invention there is provided a method of treating a polymer to increase the slip of said polymer said method comprising incorporating into said polymer a composition of general Formula 1 as defined above.

Preferably said polymer is selected from a group comprising:—
poly(butylenes terephthalate)
poly(cyclohexanedimethylene terephthalate)
poly(ethylene isophthalate)
poly(ethylene 2,6-naphthalenedicarboxylate)
poly(ethylene phthalate)
poly(ethylene terephthalate)
and co-polymers thereof.

Preferably the said composition of general Formula 1 is present in said polymer in an amount of between 0.1% to 1.0% wt/wt.

In a particularly preferred embodiment said composition of general Formula 1 is present in said polymer in an amount of between 0.2% to 0.75% wt/wt.

According to further aspects of the present invention there is provided a pre-form and a container made from a polymer as described herein, incorporating a slip agent of general Formula 1.

Preferably said container is formed from a polymer selected from a group comprising:
poly(butylenes terephthalate)
poly(cyclohexanedimethylene terephthalate)
poly(ethylene isophthalate)
poly(ethylene 2,6-naphthalenedicarboxylate)
poly(ethylene phthalate)
poly(ethylene terephthalate)
and co-polymers thereof.

According to a still further aspect of the present invention there is provided a film made from a polyester polymer as described herein incorporating a slip agent of general Formula 1.

Preferably said film is formed from a polymer selected from a group comprising:

poly(butylenes terephthalate)
poly(cyclohexanedimethylene terephthalate)
poly(ethylene isophthalate)
poly(ethylene 2,6-naphthalenedicarboxylate)
poly(ethylene phthalate)
poly(ethylene terephthalate)
and co-polymers thereof.

The present invention also extends to include a composition comprising a copolymer of a polyester and a compound of general Formula 1 wherein: R and $R^1$ represent hydrocarbon moieties, each hydrocarbon moiety comprising 1 to 34 carbon atoms and R and/or $R^1$ may be linear, branched chain, saturated or contain one or more double bonds;

X represents one of the moieties:

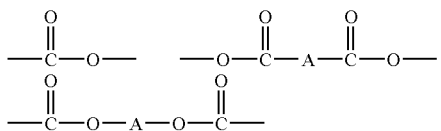

wherein A represents a hydrocarbon moiety comprising 2 to 36 carbon atoms and may be linear, branched chain, saturated or contain one or more double bonds.

The present invention therefore relates to the discovery of a novel range of slip additives for polyester polymers such as PET which are highly effective in lowering the coefficient of friction of the fabricated article whilst maintaining low colour and high clarity. More particularly, additives conforming to this invention afford a rapid reduction in the coefficient of friction that is maintained during long-term storage of the moulded part. This is particularly critical in the production of preforms and bottles from PET.

The term "PET" as used herein in describing this invention has a broad meaning. It includes all polymeric and copolymeric forms of poly (ethyleneterephthalate). The compounds of this invention are also effective slip agents for other polyester polymers and copolymers as exemplified by polybutylene terephthalate and poly (ethylene naphthalate). Thus the term PET should be considered, in this context, to be a generic term to include all polymers derived from aromatic diacids including all terephthalate polymers and their derivatives, both known and those yet to be discovered.

The additives of this invention conform to the general structure:

R—X—$R^1$ where R and $R^1$ are hydrocarbon moieties, each comprising 1 to 34 carbon atoms, and may be linear or branched chain, and may be fully saturated or contain one or more double bonds.

X conforms to one of the following structures:

—C(O)O— or

—O(O)C-A-C(O)O— or

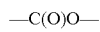
—C(O)—O-A-O—(O)C— where A is a hydrocarbon moiety comprising 2 to 36 carbon atoms, and may be linear or branched and be fully saturated or contain one or more double bonds.

In a preferred embodiment of the invention the total number of carbon atoms contained within R, $R^1$ and X is greater than 22 and preferably greater than 35.

Examples of preferred additives conforming to this invention are stearyl stearate, stearyl behenate, behenyl behenate, ethylene glycol distearate, ethyl behenate, behenyl acetate, palmityl myristate, palmityl palmate or mixtures thereof.

To achieve the required level of slip performance in PET, the additives of this invention are incorporated at levels of between 0.1% and 1% and preferably between 0.2% and 0,75% wt/wt.

The slip additives of this invention may be incorporated into the polymer by a number of processes well known to those skilled in the art. For example they may be added directly to the resin by melt dosing at the point of extrusion, by conventional masterbatch addition or by incorporation using liquid colour systems.

EXAMPLES

To demonstrate the effectiveness of the aforementioned additives in reducing the friction of PET surfaces the following procedure was adopted.

A PET co-polymer (IV 0.8) suitable for the manufacture of bottles and other food packaging containers by injection moulding, blow moulding or a combination of both was used. The PET was dried for 8 hours at 145° C. and the additive coated directly onto the surface of the polymer by tumble mixing whilst the polymer was still hot.

The PET was moulded into 100×50×2 mm plaques on a 35 tonne lock injection-moulding machine using the following conditions:

| | |
|---|---|
| Temperature: | All zones at 270° C. |
| Injection Pressure: | 85 Bar |
| Shotsize: | 29.0 mm |
| Pack: | 20 Bar; 3 secs |
| Hold: | 75 Bar; 3 secs |
| Cooling: | 20 secs |
| Tool Temp: | 10° C. |

The Coefficient of Friction (static and kinetic) of the resulting plaques were then measured on a Lloyd LRX tensile tester and a 10N load cell at the following time intervals after moulding—1 hour, 24 hours, 1 week and 2 weeks. The friction method was adapted from ASTM 1894. The sledge weight including the plaque was 1000 g and the area of surface contact between the two plaques was 50 mm×50 mm (see diagram). The test was run over a distance of 60 mm at 150 mm/min. Each test was conducted 5 times for each time interval using new plaques on each run. A diagram of the test apparatus is shown in FIG. 1.

Due to the nature of PET the friction can very from day to day depending on process and ambient conditions and its hygroscopic nature. The coefficient of friction recorded for PET with no additives was generally between 0.5 and 1.2. To enable comparisons to be made for experiments carried out on different days blank runs were carried out before and after each series of PET+additives on each day. The results are reported as a percentage of the blank as it was observed that a given additive would give a proportionally lower result on a day where a low friction was recorded for the blank A number of additives of mixed ester composition were also tested and representative compositions are given in Table II labelled Formulations 1-6.

A summary of the slip additives tested is given below:

TABLE 1

| | | Coefficient of Friction (% of blank) | | | | | |
|---|---|---|---|---|---|---|---|
| | Conc | Static | | | Dynamic | | |
| Sample | % | initial | 1 day | 7 days | initial | 1 day | 7 days |
| erucamide | 0.5 | 85 | NR | 76 | 78 | NR | 73 |
| behenamide | 0.5 | 62 | NR | 100 | 71 | NR | 96 |
| GMS 90 | 0.5 | 0 | NR | 109 | 0 | NR | 106 |
| GMB | 0.5 | 0 | NR | 124 | 0 | NR | 106 |
| PEG200 dierucate | 0.5 | 89 | NR | 40 | 72 | NR | 120 |
| PEG200 dioleate | 0.5 | NR | fail | NR | NR | fail | NR |
| Pentaerythritol dioleate | 0.5 | NR | fail | fail | NR | fail | fail |
| Pentaerythritol monooleate | 0.5 | NR | fail | fail | NR | fail | fail |
| PEG400 monolaurate | 0.5 | NR | fail | fail | NR | fail | fail |
| sorbitan monostearate | 0.5 | NR | fail | fail | NR | fail | fail |
| Calcium stearate | 0.5 | NR | NR | 124 | NR | NR | 107 |
| pentaerythritol tetrastearate | 0.5 | 95 | NR | 86 | 107 | NR | 73 |
| butyl stearate | 0.5 | 86 | NR | 87 | 70 | NR | 71 |
| EthylHexyl stearate | 0.5 | 80 | NR | 83 | 62 | NR | 63 |
| lauryl palmitate | 0.5 | 74 | NR | 85 | 63 | NR | 61 |
| oleyl behenate | 0.5 | 122 | NR | 173 | 80 | NR | 114 |
| behenyl behenate | 0.5 | 98 | NR | 94 | 118 | NR | 79 |
| lauryl behenate | 0.5 | 55 | NR | 55 | 62 | NR | 47 |
| lauryl behenate | 0.2 | 60 | NR | 72 | 57 | NR | 59 |
| oleyl erucate | 0.5 | 123 | NR | fail | 114 | fail | fail |
| EGDS | 0.5 | 92 | 90 | 68 | 86 | 95 | 77 |
| cetostearyl phthalate | 0.5 | 45 | 83 | 82 | 54 | 95 | 74 |
| butyl behenate | 0.05 | 49 | 83 | 34 | 57 | 64 | 68 |
| butyl behenate | 0.1 | 33 | 65 | 33 | 52 | 62 | 70 |
| butyl behenate | 0.2 | 18 | 38 | 24 | 42 | 55 | 62 |
| butyl behenate | 0.5 | 15 | 30 | 16 | 27 | 33 | 43 |
| ester Formulation 1 | 0.1 | 64 | 50 | 58 | 91 | 59 | 99 |
| ester Formulation 1 | 0.2 | 38 | 38 | 36 | 45 | 38 | 28 |
| ester Formulation 1 | 0.3 | 29 | 34 | 30 | 32 | 30 | 25 |
| ester Formulation 2 | 0.2 | 69 | 51 | | 80 | 62 | |
| ester Formulation 3 | 0.2 | 67 | 54 | | 64 | 44 | |
| steary stearate | 0.1 | 100 | 92 | 77 | 131 | 92 | 102 |
| stearyl stearate | 0.2 | 34 | 41 | 37 | 41 | 39 | 43 |
| stearyl stearate | 0.3 | 33 | 40 | 33 | 32 | 36 | 28 |
| stearyl behenate | 0.1 | 60 | 70 | 58 | 135 | 122 | 159 |
| stearyl behenate | 0.2 | 33 | 41 | 91 | 43 | 44 | 63 |
| stearyl behenate | 0.3 | 42 | 49 | 53 | 57 | 48 | 41 |
| stearyl palmitate | 0.1 | 175 | 109 | 312 | 270 | 162 | 244 |
| stearyl palmitate | 0.2 | 62 | 49 | 89 | 69 | 54 | 83 |
| stearyl palmitate | 0.3 | 33 | 39 | 30 | 43 | 36 | 41 |
| ester Formulation 4 | 0.2 | 48 | 46 | 48 | 56 | 48 | 47 |
| ester Formulation 5 | 0.2 | 68 | 57 | 74 | 72 | 55 | 63 |
| ester Formaultion 6 | 0.2 | 58 | 46 | 72 | 85 | 63 | 104 |
| Ethyl behenate | 0.2 | 42 | 49 | 59 | 33 | 42 | 49 |
| Behenyl acetate | 0.2 | 34 | 42 | 54 | 31 | 34 | 44 |
| Dilauryl succinate | 0.2 | 74 | 69 | | 68 | 59 | |

TABLE 2

| | | alcohol | | | | |
|---|---|---|---|---|---|---|
| | | lauryl | myristyl | palmityl | stearyl | arachidyl |
| | | Formulation 1 | | | | |
| acid | laurate | <1 | <1 | <1 | <1 | <1 |
| | myristate | <1 | 14-17 | 8-12 | 4-6 | <1 |
| | palmitate | <1 | 32-38 | 20-24 | 8-12 | <1 |
| | stearate | <1 | <1 | <1 | <1 | <1 |
| | | Formulation 2 | | | | |
| acid | laurate | <1 | <1 | <1 | <1 | <1 |
| | myristate | <1 | 13-16 | 30-34 | 12-14 | <1 |
| | palmitate | <1 | 8-10 | 18-22 | 7-10 | <1 |
| | stearate | <1 | <1 | <1 | <1 | <1 |
| | | Formulation 3 | | | | |
| acid | laurate | <1 | <1 | <1 | <1 | <1 |
| | myristate | <1 | <1 | 18-22 | 9-11 | <1 |
| | palmitate | <1 | 0.5-1.5 | 41-45 | 20-24 | <1 |
| | stearate | <1 | <1 | <1 | <1 | <1 |
| | | Formulation 4 | | | | |
| acid | laurate | <1 | <1 | <1 | <1 | <1 |
| | myristate | <1 | 7-9 | 4-6 | 2-4 | <1 |
| | palmitate | <1 | 16-19 | 10-12 | 5-7 | <1 |
| | stearate | <1 | <1 | 2-4 | 40-45 | <1 |
| | | Formulation 5 | | | | |
| acid | laurate | <1 | <1 | <1 | <1 | <1 |
| | myristate | <1 | 7-9 | 4-6 | 2-4 | <1 |
| | palmitate | <1 | 16-19 | 10-12 | 4-6 | <1 |
| | stearate | <1 | <1 | <1 | <2 | <1 |
| | arachidate | <1 | <1 | <1 | 1-3 | <1 |
| | behenate | <1 | <1 | <1 | 40-45 | <1 |
| | | Formulation 6 | | | | |
| acid | laurate | <1 | <1 | <1 | <1 | <1 |
| | myristate | <1 | 7-9 | 4-6 | 2-4 | <1 |
| | palmitate | <1 | 16-19 | 10-12 | 48-53 | <1 |
| | stearate | <1 | <1 | <1 | <1 | <1 |
| | | Formulation 1 | | | | |
| acid | laurate | <1 | <1 | <1 | <1 | <1 |
| | myristate | <1 | 14-17 | 8-12 | 4-6 | <1 |
| | palmitate | <1 | 32-38 | 20-24 | 8-12 | <1 |
| | stearate | <1 | <1 | <1 | <1 | <1 |
| | | Formulation 2 | | | | |
| acid | laurate | <1 | <1 | <1 | <1 | <1 |
| | myristate | <1 | 13-16 | 30-34 | 12-14 | <1 |
| | palmitate | <1 | 8-10 | 18-22 | 7-10 | <1 |
| | stearate | <1 | <1 | <1 | <1 | <1 |
| | | Formulation 3 | | | | |
| acid | laurate | <1 | <1 | <1 | <1 | <1 |
| | myristate | <1 | <1 | 18-22 | 9-11 | <1 |
| | palmitate | <1 | 0.5-1.5 | 41-45 | 20-24 | <1 |
| | stearate | <1 | <1 | <1 | <1 | <1 |
| | | Formulation 4 | | | | |
| acid | laurate | <1 | <1 | <1 | <1 | <1 |
| | myristate | <1 | 7-9 | 4-6 | 2-4 | <1 |
| | palmitate | <1 | 16-19 | 10-12 | 5-7 | <1 |
| | stearate | <1 | <1 | 2-4 | 40-45 | <1 |
| | | Formulation 5 | | | | |
| acid | laurate | <1 | <1 | <1 | <1 | <1 |
| | myristate | <1 | 7-9 | 4-6 | 2-4 | <1 |
| | palmitate | <1 | 16-19 | 10-12 | 4-6 | <1 |
| | stearate | <1 | <1 | <1 | <2 | <1 |
| | arachidate | <1 | <1 | <1 | 1-3 | <1 |
| | behenate | <1 | <1 | <1 | 40-45 | <1 |
| | | Formulation 6 | | | | |
| acid | laurate | <1 | <1 | <1 | <1 | <1 |
| | myristate | <1 | 7-9 | 4-6 | 2-4 | <1 |

TABLE 2-continued

|  | alcohol | | | | |
| --- | --- | --- | --- | --- | --- |
|  | lauryl | myristyl | palmityl | stearyl | arachidyl |
| palmitate | <1 | 16-19 | 10-12 | 48-53 | <1 |
| stearate | <1 | <1 | <1 | <1 | <1 |

The superior performance of the additives of this invention can be readily appreciated by reference to the above results.

Conventional amide slip agents, as exemplified by erucamide (4), lowered the coefficient of friction to between 62% and 71% of the blank but resulted in severe yellowing of the polymer. In addition, the effect was short lived and after 7 days was back to the control value.

Additives conforming to this invention afforded an equivalent or greater reduction in the coefficient of friction when compared with conventional amide slip agents but the polymer plaques remained clear and transparent. In the examples of stearyl behenate, stearyl palmitate and ester formulation 4, which represent preferred embodiments of this invention, very low coefficients of friction were achieved (30% b to 50% of the blank) at addition levels of only 0.2 to 0.3%.

It is of note that some esters of polyethylene glycol (not conforming to this invention) as exemplified by PEG 200 dierucate afforded an initial reduction in the coefficient of friction but this effect diminished over the 14-day test period. This renders compounds of this nature of little value as a long-term slip agents for PET.

It is envisaged that mixtures of slip agents of general formula 1 can be used in polymers and co-polymers and that such agents may also be used in combination with known slip agents.

Thus it can be clearly seen that additives conforming to this invention provide the unique combination of a rapid and long-lasting reduction in the coefficient of friction of PET whilst maintaining low colour and high transparency.

Whilst it is known that certain compounds of general Formula 1 as defined herein have been reported as anti-slip agents in polymers this has generally not been reported in polyester-type polymers and in particular not in PET polymers as defined herein. The activity of certain compounds, including, but in no way limited to, the group comprising stearyl stearate, stearyl behenate, behenyl behenate, ethylene glycol distearate, ethyl behenate, behenyl acetate, palmityl myristate, palmityl palmate or mixtures thereof. This group of compounds provides slip values in the order of 40% or better at the test concentrations when compared to the blank. Such values are particularly high and represent a significant improvement on currently used additives in this context.

Preparation 1

Materials

85/90% behenic acid, AV=163.7 mg KOH/g, (mwt 342.7 g/mol), 200.0 g (0.584 mole).

n-butanol (butan-1-ol) 99.4+% (Aldrich), (mwt 74.12 g/mol), 400.0 g (5.397 mole). sulphuric acid (98% min) catalyst, 4.0 g, or 1% on wt of butanol.

Procedure

A flask equipped with a stirrer and vertical water-cooled reflux condenser, was charged with the materials above and heated to and maintained at 110-120° C. under air at atmospheric pressure with constant reflux of butanol for approximately 4.5 hours. The resulting mixture was transferred to a separating funnel then 1 L of n-heptane @ 60° C. added, followed by 2 L of saturated brine solution. The whole mixture was shaken and the phases allowed to separate. The aqueous phase was run off, and the heptane phase retained. The heptane phase was then repeatedly washed with ca. 1 L of warm (60° C.) distilled water until washings were pH 6. The heptane phase was then dried over anhydrous sodium sulphate and filtered. The filtrate was evaporated to constant weight on a rotary evaporator @ 70° C. under 700 mmHg vacuum. Finally, the headspace of the vessel was blown with nitrogen for ca. 15 minutes to remove traces of butanol smell.

Yield 186 g (theoretical maximum yield=232.9 g) 80% yield.

Analysis of final product:

| AV | 4.6 mg KOH/g |
| --- | --- |
| OHV | 10.0 mg KOH/g |
| Sap value | 137.3 mg KOH/g |
| moisture | 0.02% wt |
| colour | 156 Hazen |

The invention claimed is:

1. A composition comprising a mixture of aliphatic esters consisting essentially of myristyl palmitate, palmityl myristate, palmityl palmitate, stearyl myristate, stearyl palmitate and optional components myristyl myristate, palmityl stearate, stearyl stearate, stearyl arachidate, and stearyl behenate, wherein said composition is effective in lowering the coefficient of friction of a polyester polymer.

2. The composition as claimed in claim 1 wherein said composition consists essentially of myristyl palmitate, palmityl myristate, palmityl palmitate, stearyl myristate stearyl palmitate and at least one other component selected from the group consisting of myristyl myristate, palmityl stearate, stearyl stearate, stearyl arachidate, and stearyl behenate.

3. The composition as claimed in claim 1 wherein said composition consists essentially of myristyl palmitate, palmityl myristate, palmityl palmitate, stearyl myristate, stearyl palmitate and myristyl myristate.

4. The composition as claimed in claim 1 wherein the composition comprises 14% to 17% wt/wt myristyl myristate, 32% to 38% wt/wt myristyl palmitate, 8% to 12% wt/wt palmityl myristate, 20% to 24% wt/wt palmityl palmitate, 4% to 6% wt/wt stearyl myristate and 8% to 12% wt/wt stearyl palmitate.

5. The composition as claimed in claim 3 wherein the composition comprises 14% to 17% wt/wt myristyl myristate, 32% to 38% wt/wt myristyl palmitate, 8% to 12% wt/wt palmityl myristate, 20% to 24% wt/wt palmityl palmitate, 4% to 6% wt/wt stearyl myristate and 8% to 12% wt/wt stearyl palmitate.

6. The composition as claimed in claim 1 wherein the composition comprises 13% to 16% wt/wt myristyl myristate, 8% to 10% wt/wt myristyl palmitate, 30% to 34% wt/wt palmityl myristate, 18% to 22% wt/wt palmityl palmitate, 12% to 14% wt/wt stearyl myristate and 7% to 10% wt/wt stearyl palmitate.

7. The composition as claimed in claim 3 wherein the composition comprises 13% to 16% wt/wt myristyl myristate, 8% to 10% wt/wt myristyl palmitate, 30% to 34% wt/wt palmityl myristate, 18% to 22% wt/wt palmityl palmitate, 12% to 14% wt/wt stearyl myristate and 7% to 10% wt/wt stearyl palmitate.

8. The composition as claimed in claim 2 wherein the composition comprises 0.5% to 1.5% wt/wt myristyl palmitate, 18% to 22% wt/wt palmityl myristate, 41% to 45% wt/wt palmityl palmitate, 9% to 11% wt/wt stearyl myristate and 20% to 24% wt/wt stearyl palmitate.

9. The composition as claimed in claim 1 wherein the composition comprises 7% to 9% wt/wt myristyl myristate, 16% to 19% wt/wt % myristyl palmitate, 4% to 6% wt/wt palmityl myristate, 10% to 12% wt/wt palmityl palmitate, 2% to 4% wt/wt stearyl myristate, 5% to 7% wt/wt stearyl palmitate, 2% to 4% wt/wt palmityl stearate and 40% to 45% wt/wt stearyl stearate.

10. The composition as claimed in claim 1 wherein the composition comprises 7% to 9% wt/wt myristyl myristate, 16% to 19% wt/wt myristyl palmitate, 4% to 6% wt/wt palmityl myristate, 10% to 12% wt/wt palmityl palmitate, 2% to 4% wt/wt stearyl myristate, 4% to 6% wt/wt stearyl palmitate up to 2% wt/wt stearyl stearate, 1% to 3% wt/wt stearyl arachidate and 40% to 45% wt/wt stearyl behenate.

11. The composition as claimed in claim 1 wherein the composition comprises 7% to 9% wt/wt myristyl myristate, 16% to 19% wt/wt myristyl palmitate, 4% to 6% wt/wt palmityl myristate, 10% to 12% wt/wt palmityl palmitate, 2% to 4% wt/wt stearyl myristate and 48% to 53% wt/wt stearyl palmitate.

12. The composition as claimed in claim 3 wherein the composition comprises 7% to 9% wt/wt myristyl myristate, 16% to 19% wt/wt myristyl palmitate, 4% to 6% wt/wt palmityl myristate, 10% to 12% wt/wt palmityl palmitate, 2% to 4% wt/wt stearyl myristate and 48% to 53% wt/wt stearyl palmitate.

13. A method of lowering the co-efficient of friction of a polyester polymer, said method comprising incorporating into said polyester polymer a composition comprising a mixture of aliphatic esters comprising myristyl palmitate, palmityl myristate, palmityl palmitate, stearyl myristate, stearyl palmitate, and optional components myristyl myristate, palmityl stearate, stearyl stearate, stearyl arachidate and stearyl behenate.

14. A method of lowering the co-efficient of friction of a polyester polymer, said method comprising incorporating into said polyester polymer a composition, wherein said composition is as defined in claim 2.

15. The method as claimed in claim 13 wherein the polyester polymer is selected from the group consisting of:
   poly(butylene terephthalate)
   poly(cyclohexanedimethylene terephthalate)
   poly(ethylene isophthalate)
   poly(ethylene 2,6-naphthalenedicarboxylate)
   poly(ethylene phthalate)
   poly(ethylene terephthalate)
   and co-polymers thereof.

16. The method as claimed in claim 14 wherein the polyester polymer is selected from the group consisting of:
   poly(butylene terephthalate)
   poly(cyclohexanedimethylene terephthalate)
   poly(ethylene isophthalate)
   poly(ethylene 2,6-naphthalenedicarboxylate)
   poly(ethylene phthalate)
   poly(ethylene terephthalate)
   and co-polymers thereof.

17. The method as claimed in claim 13 inclusive wherein said composition is present in said polyester polymer in an amount of between 0.1% to 1.0% wt/wt.

18. The method as claimed in claim 15 inclusive wherein said composition is present in said polyester polymer in an amount of between 0.1% to 1.0% wt/wt.

19. The method as claimed in claim 17 wherein said composition is present in said polyester polymer in an amount of between 0.2% to 0.75% wt/wt.

20. The method as claimed in claim 18 wherein said composition is present in said polyester polymer in an amount of between 0.2% to 0.75% wt/wt.

21. A polyester polymer incorporating a co-efficient of friction lowering composition comprising a mixture of aliphatic esters comprising myristyl palmitate, palmityl myristate, palmityl palmitate, stearyl myristate, stearyl palmitate, and optional components myristyl myristate, palmityl stearate, stearyl stearate, stearyl arachidate and stearyl behenate.

22. The polyester polymer as claimed in claim 21 wherein said composition comprises myristyl palmitate, palmityl myristate, palmityl palmitate, stearyl myristate, stearyl palmitate and myristyl myristate.

23. The polyester polymer as claimed in claim 22 additionally comprising palmityl stearate and stearyl stearate.

24. The polyester polymer as claimed in claim 21 inclusive wherein the polyester polymer is selected from the group consisting of:
   poly(butylene terephthalate)
   poly(cyclohexanedimethylene terephthalate)
   poly(ethylene isophthalate)
   poly(ethylene 2,6-naphthalenedicarboxylate)
   poly(ethylene phthalate)
   poly(ethylene terephthalate)
   and co-polymers thereof.

25. The polyester polymer as claimed in claim 21 inclusive wherein said composition is present in said polyester polymer in an amount of between 0.1% to 1.0% wt/wt.

26. The polyester polymer as claimed in claim 24 inclusive wherein said composition is present in said polyester polymer in an amount of between 0.1% to 1.0% wt/wt.

27. The polyester polymer as claimed in claim 25 wherein said composition is present in said polyester polymer in an amount of between 0.2% to 0.75% wt/wt.

28. The polyester polymer as claimed in claim 26 wherein said composition is present in said polyester polymer in an amount of between 0.2% to 0.75% wt/wt.

29. A container made from a polyester polymer as claimed in claim 21.

30. A container made from a polyester polymer as claimed in claim 24.

31. A film made from a polyester polymer as claimed in claim 21.

32. A film made from a polyester polymer as claimed in claim 24.

33. A composition effective in lowering the co-efficient of friction of a polyester polymer as claimed in claim 1.

34. A method of lowering the co-efficient of friction of a polyester polymer by incorporating into the polyester polymer a composition according to claim 3.

* * * * *